3 Sheets—Sheet 1.

F. W. KREMER & T. G. WILLIAMS.
Oatmeal-Machine.

No. 208,684. Patented Oct. 8, 1878.

Attest:
H. L. Perrine,
H. B. Groff.

Inventors.
Frank W. Kremer.
Thomas G. Williams.
by Wm H Pincket Atty.

3 Sheets—Sheet 2.

F. W. KREMER & T. G. WILLIAMS.
Oatmeal-Machine.

No. 208,684. Patented Oct. 8, 1878.

Attest:
H. L. Perrine
H. B. Groff

Inventors.
Frank W. Kremer,
Thomas G. Williams.
By Wm. H. Finckel, Atty.

3 Sheets—Sheet 3.
F. W. KREMER & T. G. WILLIAMS.
Oatmeal-Machine.
No. 208,684. Patented Oct. 8, 1878.
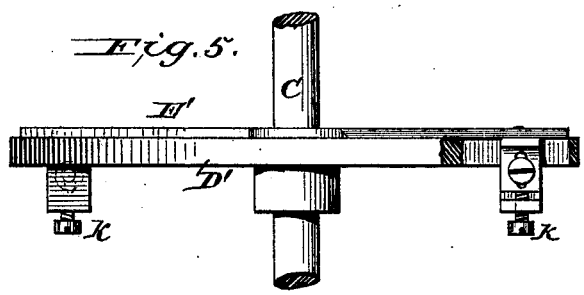
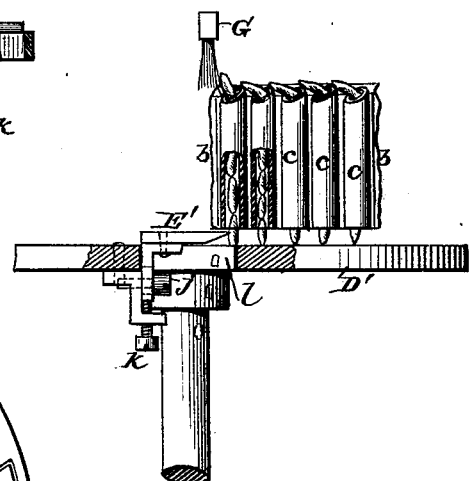
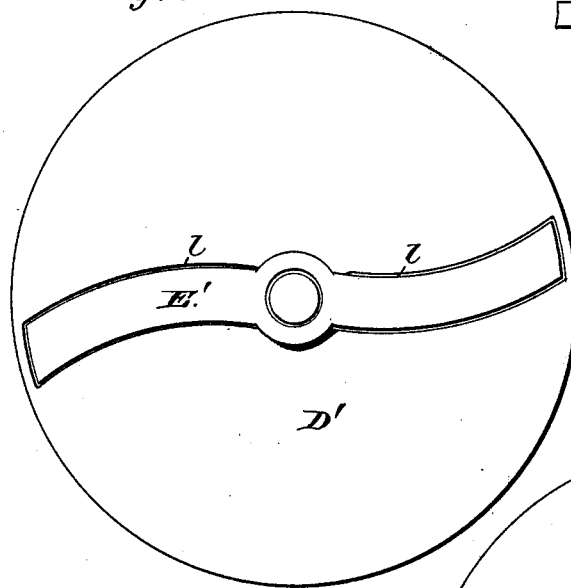
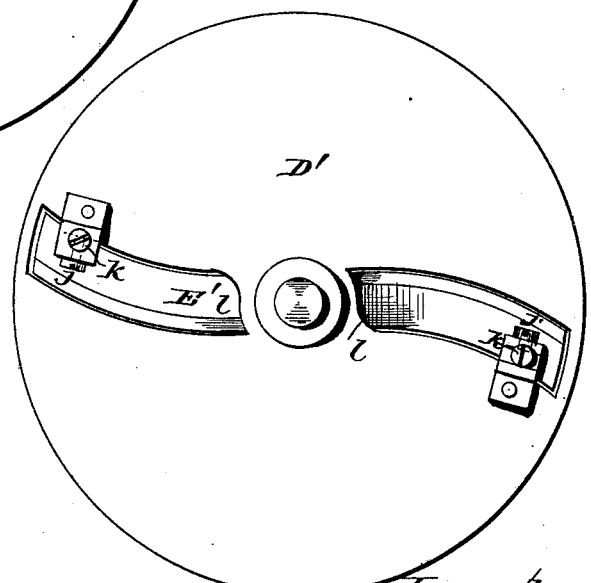
Attest.
H. L. Perrine
H. B. Goff
Inventors.
Frank W. Kremer.
Thomas G. Williams.
By Wm. H. Finckel, Atty.

UNITED STATES PATENT OFFICE.

FRANK W. KREMER AND THOMAS G. WILLIAMS, OF AKRON, OHIO.

IMPROVEMENT IN OATMEAL-MACHINES.

Specification forming part of Letters Patent No. 208,684, dated October 8, 1878; application filed May 8, 1878.

*To all whom it may concern:*

Be it known that we, FRANK W. KREMER and THOMAS G. WILLIAMS, both of Akron, in the county of Summit and State of Ohio, have invented certain new and useful Improvements in Oatmeal-Machines, of which the following is a full, clear, and exact description.

Our invention relates to certain improvements in machinery for cutting oats for producing what is commonly designated "oatmeal."

The invention consists in a tubular head, constructed as hereinafter described, through which the oats are fed to a cutting mechanism, the tubes of said head being kept full of oats at all times, so as to insure a constant supply to the cutters, the oats being fed through the tubes to the cutters one at a time from each tube, so that no whole oats can escape.

The invention also consists of a feeder-head constructed of tubes, and hereinbefore denominated a "tubular head," the receiving ends of which are inclined or cut off at an angle, so that the oats falling from the hopper may be more readily forced into the tubes by a brush, and be fed thence to the cutter.

The invention further consists in a brush rotated over the tubular head, and serving to force the oats, ends up, into the tubes.

The invention further consists in the combination, with a tubular head, of a head provided with rods adapted to be inserted in the tubes for cleaning them or removing obstructions.

The invention consists, finally, in a feeder composed of divided or other annular partitions, recessed or corrugated, so as to receive between them and embrace the feeding-tubes.

Figure 1:
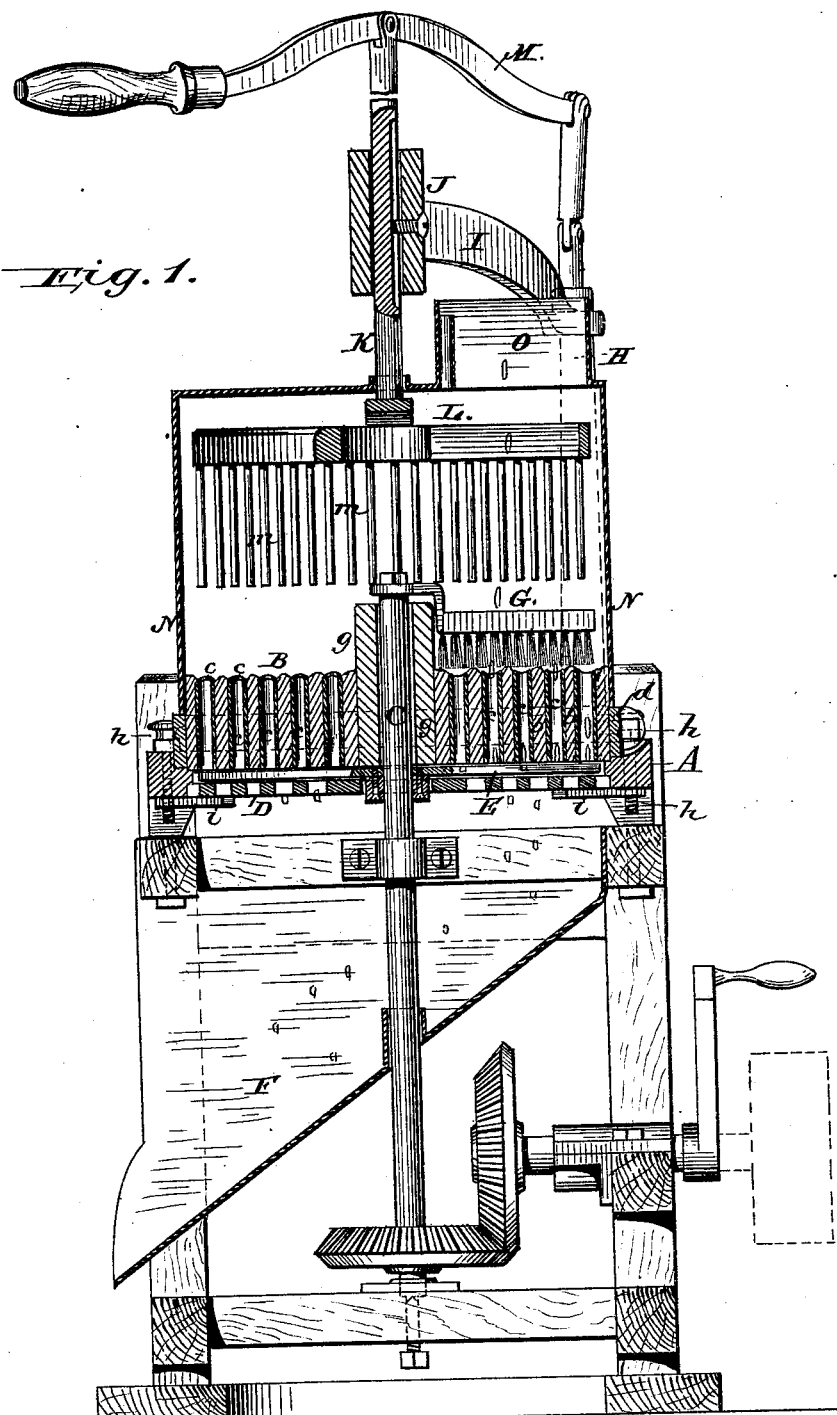
Figure 2:
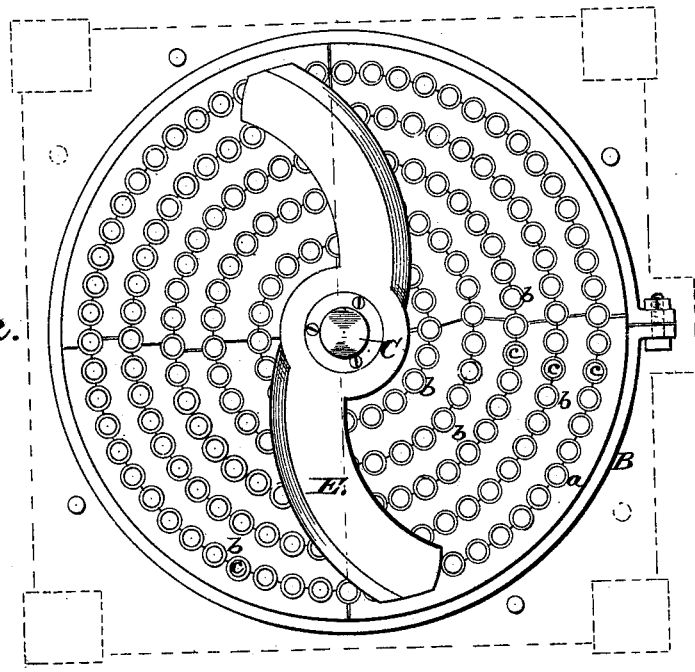
Figure 3:
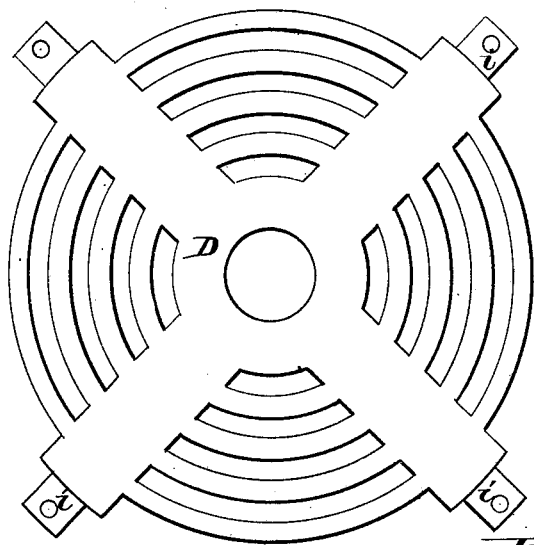
Figure 4:

In the accompanying drawings, illustrating our invention, Figure 1 is a central vertical section; Fig. 2, a bottom-plan view of the cutter and tubular head; Fig. 3, a top view of the grating; Fig. 4, a plan of parts of the annular partitions, showing the recesses or corrugations. Fig. 5 is a side elevation of a different form of cutter and platform, the latter a substitute for the grating of Figs. 1 and 3; Fig. 6, a top view, and Fig. 7 a bottom view, of the same; Fig. 8, a partially sectional side elevation of the tubular head in part, the brush, and the modified form of cutter and platform, illustrating the operation.

The letter A designates a bed-plate having a central annular recess, in which rests a cylindrical feeder, B. This feeder is composed of rings $a$ $b$ and tubes $c$, all bound together by a band or strap, $d$. The outer ring, $a$, has semicircular recesses $e$ (see Fig. 4) upon its inner face, and the several rings $b$ have similar recesses $f$ upon both faces, and these several rings are concentric, and gradually diminish in diameter, so as to fit one within the other. For convenience in fitting up a feeder constructed with these rings, they may be divided into two or more parts. They may also be made entire or of one piece.

The tubes $c$ are placed within the cylindrical openings formed by the recesses $ef$ and $ff$ when the rings are brought together; and when the band $d$ is drawn together, as by a tightening-screw passing through flanges upon its ends, the rings and tubes will be firmly united to form a complete device.

The upper ends of the tubes $c$ are beveled, as seen in Fig. 1, so that as the oats fall from the hopper they will enter the tubes after the manner indicated in Fig. 8, the lower end being in the lowest edge of one tube, while the upper end rests upon the upper or highest edge of the adjacent tube until swept into the tube by a brush, hereinafter specified.

The center of the feeder B may be provided with a sleeve, $g$, through which the operating-shaft C passes. This shaft also passes through a grating or slotted platform, D, arranged beneath the feeder or tubular head B, and adjustable relatively thereto by set-screws $h$ in the bed A, and connected with ears $i$ of the grating.

Between the bottom of the tubular feeder-head and top of the grating, and upon the shaft C, is arranged a knife or cutter, or a number of knives or cutters, E. These cutters E revolve with the shaft, while the feeder and grating are stationary.

As shown in Figs. 5 to 8, the cutters may be fixed upon a platform, D', revolving with the shaft. In this case the platform will be solid, and takes the place of the grating, the only openings in it being beneath the knives E'. These knives E' are secured to the platform by set-screws $j$ $k$, whereby they may be adjusted vertically, in order to cut more or less fine or short, the cut oats falling through the openings $l$.

Beneath the grating D or platform D' is arranged a chute, F, for conveying away the product of the machine.

Upon the upper end of the shaft C is attached a brush, G, revolving with the shaft and sweeping over the upper end of the feeder.

Rising from the bed A are posts H, united at their upper ends by a spider, I, at the center of which spider is a box, J, in which is arranged a rod, K. This rod has attached to its lower end a block or stock-piece, L, in which are secured rods $m$, corresponding in number, if desired, with the tubes in the feeder B. This device we designate a "feeder-cleaner," because, by means of a lever, M, it is adapted to be raised and lowered in the tubes $c$, and thereby remove any obstruction in such tubes and otherwise clean them.

Surrounding the feeder and cleaner is a partible casing, N, fitting close to the feeder and provided with a hopper, O, through which the oats are fed to the machine. An opening is made in the stock L for the passage of the oats.

The mechanism described is arranged upon appropriate framing, and its shaft is operated by power suitably applied through gearing or otherwise.

The operation is as follows: Oats being fed into the hopper fall through the cleaner on the tubular head, and the revolving brush sweeps them into the tubes, down which they fall in an upright or longitudinal position, and their ends rest upon the grating, (or platform D',) where the knives meet them and crush or cut them, so as to form oatmeal. The knives are arranged to strike the grain at an angle of about forty-five degrees with a shears-like cut, and, when severed, the pieces fall through the grating or platform and escape at the delivery-chute. The fineness of the meal is regulated by adjusting the grating or the knives E', by means of the set-screws, relatively to the bottom of the tubular head, the effect of a close proximity of the two being that the oats project but a little from the tubes, when they meet the grating, and are hence cut fine, while the farther the grating is removed from the feeder the greater the projection of the oats, and consequently the coarser the resultant meal.

By the employment of the tubular head a constant and full supply of oats is kept for the cutters, the tubes being always full, and this will be found a decided advantage over that form of oatmeal-machines commonly used, where the feeder is a flat perforated plate, for in this latter form the falling through of the oats to the cutter is a matter of chance, and not positively governed by mechanism, as in ours, so that by our machine more meal can be made in a given time, and the machine can be run faster and with less attention.

The cleaner is used when the tubes become clogged, and is operated by lowering the lever M, whereby the rods are brought down, and, entering the tubes, effectually clear them, which operation may be repeated as often as desirable, the rods being raised and lowered by the lever M, as described.

By constructing the rings $a$ $b$ so as to form cylindrical recesses for the reception of the tubes, the top of the head presents a solid face outside of the tubes, and hence leaves no spaces for the oats to clog. The tops of these rings may be beveled and project above the tops of the tubes, so as to form gutters, within which the tubes are set, so as to facilitate the entrance of the oats into the said tubes, the oats, of necessity, falling into these gutters.

The feeder-heads may be constructed wholly of tubes, with an outside binder or band; or they may be made of alternate bands, tubes, and rings or partitions, omitting the cylindrical recesses in the rings for the reception of the tubes, and the interstices in these forms may or may not be filled or covered in.

The casing N is made partible, so as to be readily removed when desirable, as for cleaning or repairing.

What we claim, is—

1. A tubular feeder for an oatmeal-machine, the tops of the tubes of which are beveled or cut off at an angle to their vertical axes, substantially as and for the purpose described.

2. The combination, with a tubular feeder in an oatmeal-machine, of a brush rotated over said feeder, substantially as and for the purpose described.

3. In an oatmeal-machine, a tubular feeder, in combination with a cleaner-head, substantially as and for the purpose described.

4. The combination of a series of rings, annular walls, or partitions, alternating with a number of series of tubes, substantially as described.

5. In a tubular feeder, a series of tubes, in combination with a series of concentric rings having recessed faces, whereby said rings are adapted to inclose or embrace said series of tubes, so as to fill up all interstices between them and present a solid face upon the feeder, substantially as described.

6. In a tubular feeder, the concentric rings, having beveled tops, in combination with the tubes, whereby gutters are formed over said tubes, substantially as and for the purpose described.

7. A tubular feeder the tops of the openings in which are beveled or cut off at an angle to their vertical axes and surrounded by gutters, substantially as described.

The above specification of our invention signed by us this 30th day of April, A. D. 1878.

FRANK W. KREMER.
THOMAS G. WILLIAMS.

Witnesses:
N. C. BARTON,
J. F. FAHS.